(12) United States Patent
Kanehisa et al.

(10) Patent No.: US 7,360,952 B2
(45) Date of Patent: Apr. 22, 2008

(54) BICYCLE HUB

(75) Inventors: Takanori Kanehisa, Sakai (JP); Atsuhiro Nishimura, Sakai (JP)

(73) Assignee: Shimano Inc., Osaka (JP)

( * ) Notice: Subject to any disclaimer, the term of this patent is extended or adjusted under 35 U.S.C. 154(b) by 114 days.

(21) Appl. No.: 11/041,283

(22) Filed: Jan. 25, 2005

(65) Prior Publication Data

US 2005/0185872 A1 Aug. 25, 2005

(30) Foreign Application Priority Data

Feb. 20, 2004 (JP) ............................. 2004-044937

(51) Int. Cl.
*F16C 19/08* (2006.01)
(52) U.S. Cl. .................................... 384/545
(58) Field of Classification Search ................ 384/545, 384/544, 543, 519, 477, 520; 474/70, 160, 474/266; 301/110.5, 110.6, 124; 192/64, 192/110 B, 110 R, 217.3
See application file for complete search history.

(56) References Cited

U.S. PATENT DOCUMENTS

| | | | |
|---|---|---|---|
| 1,527,915 A | | 2/1925 | Phelan |
| 2,741,934 A | * | 4/1956 | Douglas ..................... 175/266 |
| 4,580,670 A | * | 4/1986 | Nagano ........................ 192/64 |
| 5,324,100 A | * | 6/1994 | James ...................... 301/110.5 |
| 5,575,540 A | | 11/1996 | Chi |
| 5,909,931 A | * | 6/1999 | Tabe ....................... 301/110.5 |
| 5,997,104 A | * | 12/1999 | Campagnolo ............ 301/110.5 |
| 6,260,681 B1 | * | 7/2001 | Chen ....................... 192/110 B |
| 6,386,644 B2 | * | 5/2002 | Chen ....................... 301/110.5 |
| 6,511,133 B1 | * | 1/2003 | Tabe ....................... 301/110.5 |
| 6,783,192 B2 | * | 8/2004 | Meggiolan ............... 301/110.5 |
| 2003/0198419 A1 | * | 10/2003 | Chen ........................... 384/545 |
| 2004/0140709 A1 | * | 7/2004 | Kanehisa .................. 301/110.5 |
| 2004/0165805 A1 | * | 8/2004 | Kanehisa et al. ........... 384/545 |
| 2004/0169418 A1 | * | 9/2004 | Kanehisa et al. ........ 301/124.2 |
| 2004/0182654 A1 | | 9/2004 | Chen |

FOREIGN PATENT DOCUMENTS

| | | | | |
|---|---|---|---|---|
| EP | 1 262 335 A2 | * | 4/2002 | |
| EP | 1 288 117 A2 | | 3/2003 | |
| FR | 1 367 662 | * | 7/1964 | |
| FR | 2 482 526 | * | 11/1980 | |
| JP | 52-60062 U | | 5/1977 | |
| JP | 52-121001 U | * | 9/1977 | |
| JP | 59-54298 U | * | 4/1984 | |

(Continued)

*Primary Examiner*—Marcus Charles
(74) *Attorney, Agent, or Firm*—Global IP Counselors, LLP

(57) ABSTRACT

A bicycle hub is provided that comprises a hub axle, a hub body, a bearing and a clearance adjusting member. The bearing includes an outer ring coupled to the hub body, an inner ring coupled to the hub axle, and a plurality of rolling components disposed between the outer ring and the inner ring. The clearance adjusting member is disposed with respect to the outer ring of the bearing such that at least a portion of the clearance adjusting member is disposed axially inwardly of the outer ring. The clearance adjusting member is configured and arranged to prevent a grease inside the bearing to leak toward an axially inward direction of the hub axle with a prescribed radial clearance being maintained between the clearance adjusting member and one of the hub axle and the outer ring of the bearing.

22 Claims, 8 Drawing Sheets

FOREIGN PATENT DOCUMENTS

| | | | | |
|---|---|---|---|---|
| JP | 02-103803 U | * | 8/1990 |
| JP | 06-079604 U | * | 11/1994 |
| JP | 06-312601 A | * | 11/1994 |
| JP | 2001-213104 A | * | 8/2001 |
| JP | 2002-192903 A | * | 7/2002 |
| JP | 2003-063203 A | * | 3/2003 |

* cited by examiner

BICYCLE HUB

CROSS-REFERENCE TO RELATED APPLICATIONS

This application claims priority to Japanese Patent Application No. 2004-044937. The entire disclosure of Japanese Patent Application No. 2004-044937 is hereby incorporated herein by reference.

BACKGROUND OF THE INVENTION

1. Field of the Invention

The present invention relates to a bicycle hub mounted to a bicycle frame.

2. Background Information

Official Gazette for Kokai Utility Model No. S52-60062 discloses a conventional bicycle hub installed in the central portion of a wheel of a bicycle comprises a hub axle, a hub body and a pair of bearings. The hub axle is non-rotatably mounted to a frame of the bicycle (for example, to a front-fork). The hub body is coaxially coupled to the hub axle so that the hub body is disposed radially outwardly with respect to the hub axle. The bearings are configured and arranged to support the hub body so that the hub body can freely rotate around the hub axle. The outer peripheral surface of the hub axle includes a pair of male screw sections in axial ends thereof so that the hub is mounted to the frame by a pair of nuts that are screw on axial ends of the male screw of the hub axle. The bearings are angular-type bearings. Each of the bearings is provided with an outer ring, an inner ring, and a plurality of rolling components. The outer ring is disposed along an inner peripheral surface of the hub body and includes a ball receiving surface. The inner ring is screwed into the hub axle and includes a ball pushing surface. The rolling components are disposed between the outer ring and the inner ring at predetermined intervals in a circumferential direction of the hub.

The inner portion of each of the bearings is filled with grease in order to make the rotation of the bearings smooth. The ball receiving surface of the outer ring is arranged as a concaved surface that faces toward a generally axial outward direction of the hub axle. The ball pushing surface of the inner ring is arranged as a concaved surface that faces toward a generally axial inward direction of the hub axle. The angular-type ball bearing installed on the hub is designed to maintain a certain degree of clearance or gap between the radial innermost peripheral surface of the outer ring and an outer peripheral surface of the hub axle. Moreover, a sealing component is coupled to an outer axial direction of the bearing. Therefore, the bearing is designed so that the grease does not leak towards the outer axial direction of the bearing.

However, since there is the clearance between the outer ring and the hub axle in at an axial inner position of the bearing, the grease filled within the bearing occasionally leaks towards the inner axial direction of the bearing. Especially when the hub includes the male screw section is formed in the same screw direction along the entire surface of the outer peripheral surface of the hub axle, the male screw acts like a pump due to the rotation of the wheel (i.e., the rotation of the outer ring of the bearing) relative to the hub axle. Consequently, the grease flows out form the bearing toward the inner axial direction of the hub axle. For example, in a case in which the male screw is a right-handed screw, in the bearing on the right side as viewed from the rear side of the bicycle, when the wheel rotates in the direction of travel, the grease tends to flow out toward the inner axial direction of the hub axle. When the grease flows out from the bearing toward the inner axial direction of the hub axle, the grease tends to travel toward a relatively larger space behind the outer ring and retained in that space due to the centrifugal force. In such a case, the amount of the grease in the bearing becomes insufficient, and rotation of the wheel deteriorates.

In view of the above, it will be apparent to those skilled in the art from this disclosure that there exists a need for an improved bicycle hub. This invention addresses this need in the art as well as other needs, which will become apparent to those skilled in the art from this disclosure.

SUMMARY OF THE INVENTION

One object of the present invention is to prevent grease from flowing out from the bearing toward the inner axial direction.

In order to achieve the above mentioned object and other objects of the present invention, a bicycle hub is provided that comprises a hub axle, a hub body, a first bearing and a clearance adjusting member. The hub axle is configured and arranged to be non-rotatably coupled to a bicycle. The hub body is coaxially coupled on the hub axle so that the hub body is disposed radially outwardly with respect to the hub axle. The first bearing is disposed between the hub body and the hub axle so that the hub body freely rotates with respect to the hub axle. The first bearing includes a first outer ring, a first inner ring and a plurality of first rolling components. The first outer ring is coupled to the hub body. The first inner ring is non-rotatably coupled to the hub axle in a position with respect to the first outer ring so that the first inner ring faces the first outer ring. The first rolling components are installed between the first outer ring and the first inner ring. The clearance adjusting member is disposed with respect to the first outer ring of the first bearing such that at least a portion of the clearance adjusting member is disposed axially inwardly of the first outer ring. The clearance adjusting member is configured and arranged to prevent a grease inside the first bearing to leak toward an axially inward direction of the hub axle with a prescribed radial clearance being maintained between the clearance adjusting member and one of the hub axle and the first outer ring of the first bearing.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
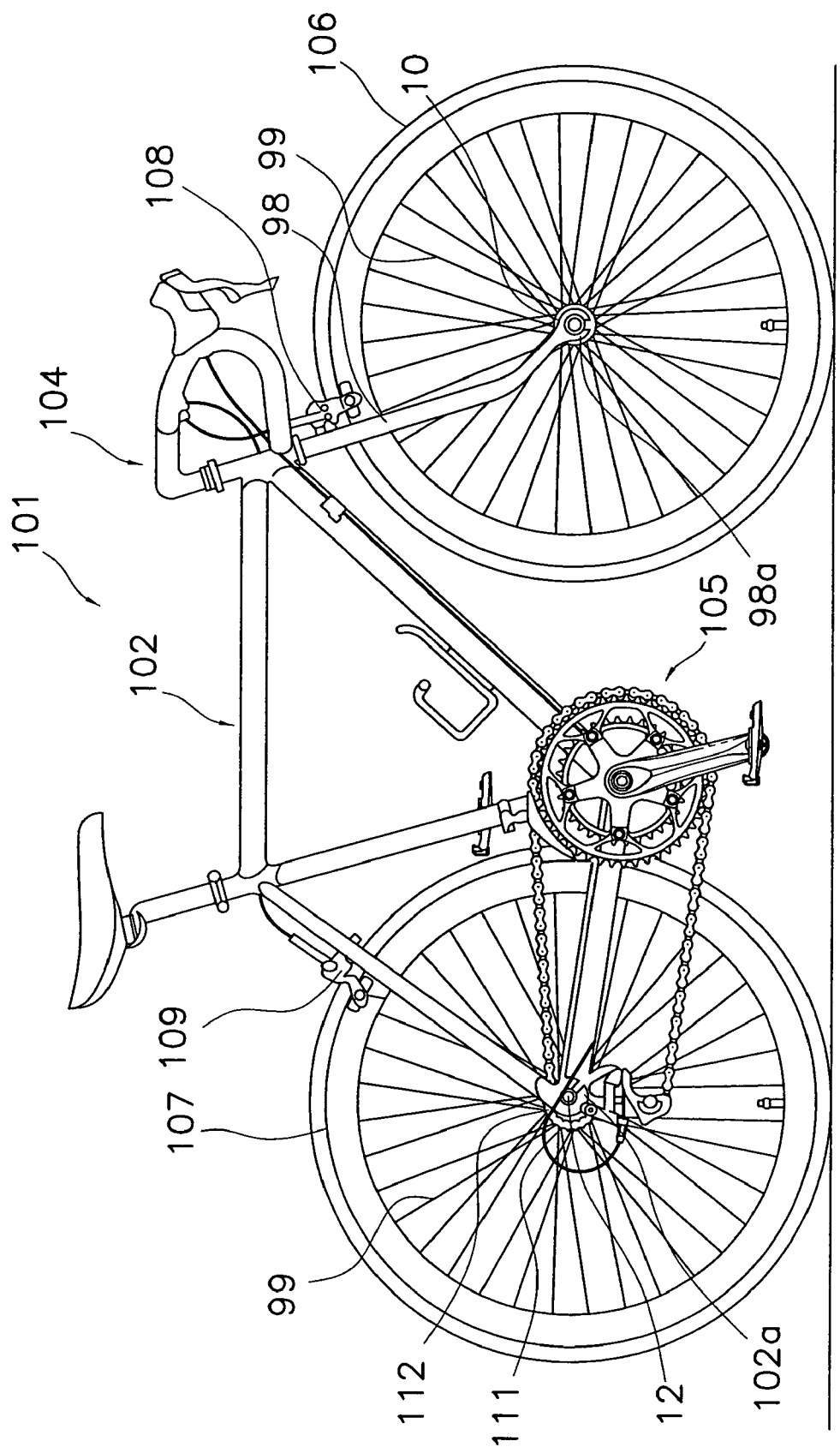
FIG. 1 is an overall right side elevational view of a bicycle provided with a front hub and a rear hub in accordance with a first embodiment of the present invention.

Referring initially to FIG. 1, a bicycle 101 with a front hub 10 and a rear hub 12 is illustrated in accordance with a first embodiment of the present invention. As seen in FIG. 1, the bicycle 101 is arranged as a road racer. The bicycle 101 includes a diamond-shaped frame 102, a handle 104, a drive unit 105, a pair of front and rear wheels 106 and 107. The frame 102 comprises a front fork 98. The handle 104 is fixedly coupled to the front fork 98. The drive unit 105 basically comprises a chain, pedals, a derailleur, front and rear sprockets, and other conventional parts. The front and rear wheels 106 and 107 are coupled to the front fork 98 and the rear portion of the frame 102. Each of the front and rear wheels 106 and 107 includes a plurality of spokes 99. Moreover, the front and rear wheels 106 and 107 are provided with a front brake 108 and rear brake 109, respectively. The front hub 10 is coupled to a center potion of the front wheel 106, and the rear hub 12 is coupled to a center portion of the rear wheel 107.

Figure 2:
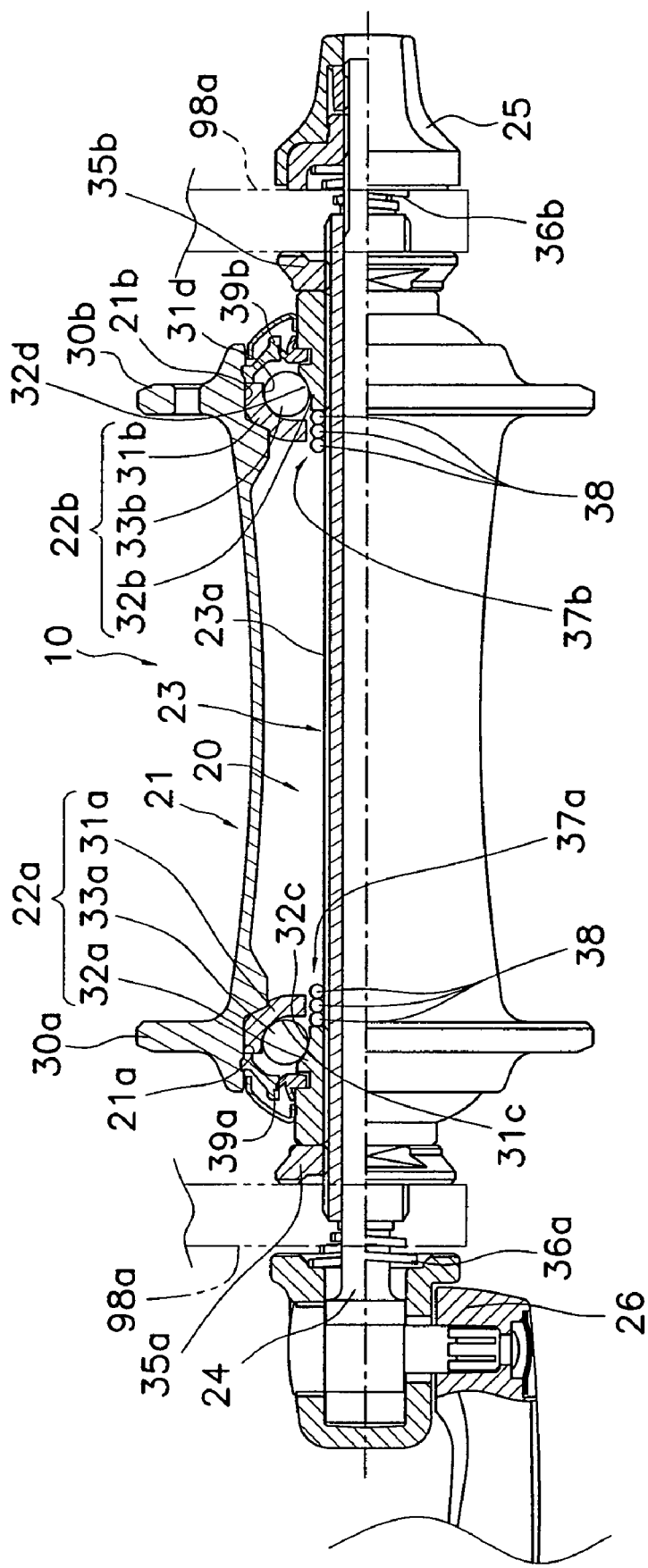
FIG. 2 is a partial cross sectional view of the front hub in accordance with the first embodiment of the present invention.

As shown in FIG. 2, the front hub 10 basically comprises a hub axle 20, a hub body 21, and a pair of left and right bearings 22a and 22b. The hub axle 20 is configured to be freely attachable to or detachable from a pair of right and left fork end portions 98a that are disposed in the lower end of the front fork 98. The hub body 21 is coaxially disposed radially outwardly with respect to the hub axle 20. The left bearing 22a and the right bearing 22b are disposed between the hub axle 20 and the hub body 21 at axial end portions of hub body 21 as seen in FIG. 2.

The hub axle 20 of the front hub 10 is arranged as a quick release lever type hub axle, which basically comprises a hollow (tubular) axle body 23, a quick hub rod 24, an adjusting nut 25, a and a cam lever 26. The axle body 23 has a right handed male screw section 23a extending along the entire surface of the outer peripheral surface thereof. The quick hub rod 24 penetrates through the axle body 23 with the adjusting nut 25 screwed on one axial end thereof. The cam lever 26 is coupled to the other axial end of the quick hub rod 24. As seen in FIG. 2, a pair of volume springs 36a and 36b are coupled between the one end of the axle body 23 (right end of FIG. 2) and the adjusting nut 25, and between the other end of the axle body 23 (left end of FIG. 2) and the cam lever 26.

The hub body 21 of the front hub 10 has a generally tubular shape and is, for example, made of aluminum alloy. The hub body 21 includes a pair of hub flanges 30a and 30b as seen in FIG. 2 and the spokes 99 are latched on the radial end portions of the outer perimeters of the hub flanges 30a and 30b. The hub body 21 further includes a pair of bearing mounting sections 21a and 21b in axial end portions thereof for mounting the left bearing 22a and the right bearing 22b, respectively.

The left bearing 22a basically comprises a left outer ring or cup 31a, a left inner ring or cone 32a and a plurality of rolling components 33a (only one left rolling component 33a is shown in FIG. 2). Similarly, the right bearing 22b comprises a right outer ring 31b, a right inner ring 32b and a plurality of rolling components 33b (only one right rolling component is shown in FIG. 2). The left outer ring 31a of the left bearing 22a and the right outer ring 31b of the right bearing 22b are pressed into the bearing mounting sections 21a and 21b of the hub body 21, respectively, which are formed on the inner perimeter in the axial end portions of the hub body 21. The left outer ring 31a includes a ball receiving surface 31c that faces in a generally axial outward direction. The right outer ring 31b includes a ball receiving surface 31d that faces in a generally axial outward direction. The left inner ring 32a includes a ball pushing surface 32c that faces in a generally axial inward direction. The right inner ring 32b includes a ball pushing surface 32d that faces in a generally axial inward direction. Therefore, the left bearing 22a and the right bearing 22b are arranged as angular ball bearings, in which the load capacity relative to the thrust direction is greater. The left inner ring 32a and the right inner ring 32b are screwed into the male screw section 23a, which is formed on the outer peripheral surface of the axle body 23 of the hub axle 20. The axial positions of the left inner ring 32a and the right inner ring 32b are locked by a pair of lock nuts 35a and 35b that are installed in contact with the axial end surfaces of the left inner ring 32a and the right inner ring 32b, respectively. Therefore, the left inner ring 32a and the right inner ring 32b are not movable in the axial direction. The front hub 10 includes a pair of sealing components 39a and 39b that are disposed in the outer axial end portions of the left bearing 22a and the right bearing 22b, respectively.

Moreover, in the front hub 10 of this embodiment, a clearance adjusting member 37a is provided between the radial inner surface of the left outer ring 31a, which is closest to the axle body 23, and the outer peripheral surface of the axle body 23 of the hub axle 20. Likewise, a clearance adjusting member 37b is provided between the radial inner surface of the right outer ring 31b, which is closest to the axle body 23, and the outer peripheral surface of the axle body 23 of the hub axle 20. In this first embodiment, each of the clearance adjusting members 37a and 37b preferably comprises three O-rings 38 that are arranged on the outer peripheral surface of the axle body 23. More specifically, the three O-rings 38 are arranged side by side in a direction toward the axial inner portion of the axle body 23 as one of the O-rings 38 abuts against the axial inner end surface of the left or right inner ring 32a and 32b as seen in FIG. 2. The clearance adjusting members 37a and 37b are configured such that a minimum clearance or gap between the radial outer most surface of the clearance adjusting members 37a and 37b and the radial inner surface of the left outer ring 31a and the right outer ring 31b is set to, for example, approximately 0.4 mm.

With the front hub 10 in the first embodiment as described above, the clearance or gap between the axle body 23 and the left outer ring 31a or the right outer ring 31b in the radial direction of the hub axle 20 is narrowed by providing the clearance adjusting members 37a and 37b between the axle body 23 of the hub axle 20 and the left and right outer rings 31a and 31b. At the same time, the grease contained inside the left bearing 22a and the right bearing 22b is less likely to leak toward the inner axial direction of the hub axle 20. In particular, when the clearance adjusting members 37b is not provided in the right bearing 22b shown in the right side of FIG. 2, when the front wheel 106 rotates in the direction of travel, the grease tends to leak out from the right bearing 22b with the male screw section 23a acting as the pump. However, by installing the clearance adjusting member 37b as seen in FIG. 2, the clearance between the right outer ring 31b and the hub axle 20 is narrowed. Consequently, the grease is less likely to leak in the inner axial direction of the hub axle 20 and more likely to be retained within the right bearing 22b. In addition, because there is the clearance (approximately 0.4 mm) between the clearance adjusting members 37a and 37b and the left outer ring 31a and the right outer ring 31b, respectively, the deterioration of rotational performance of the left and right bearings 22a and 22b, such as heavy rotation, can be prevented.

Figure 3:
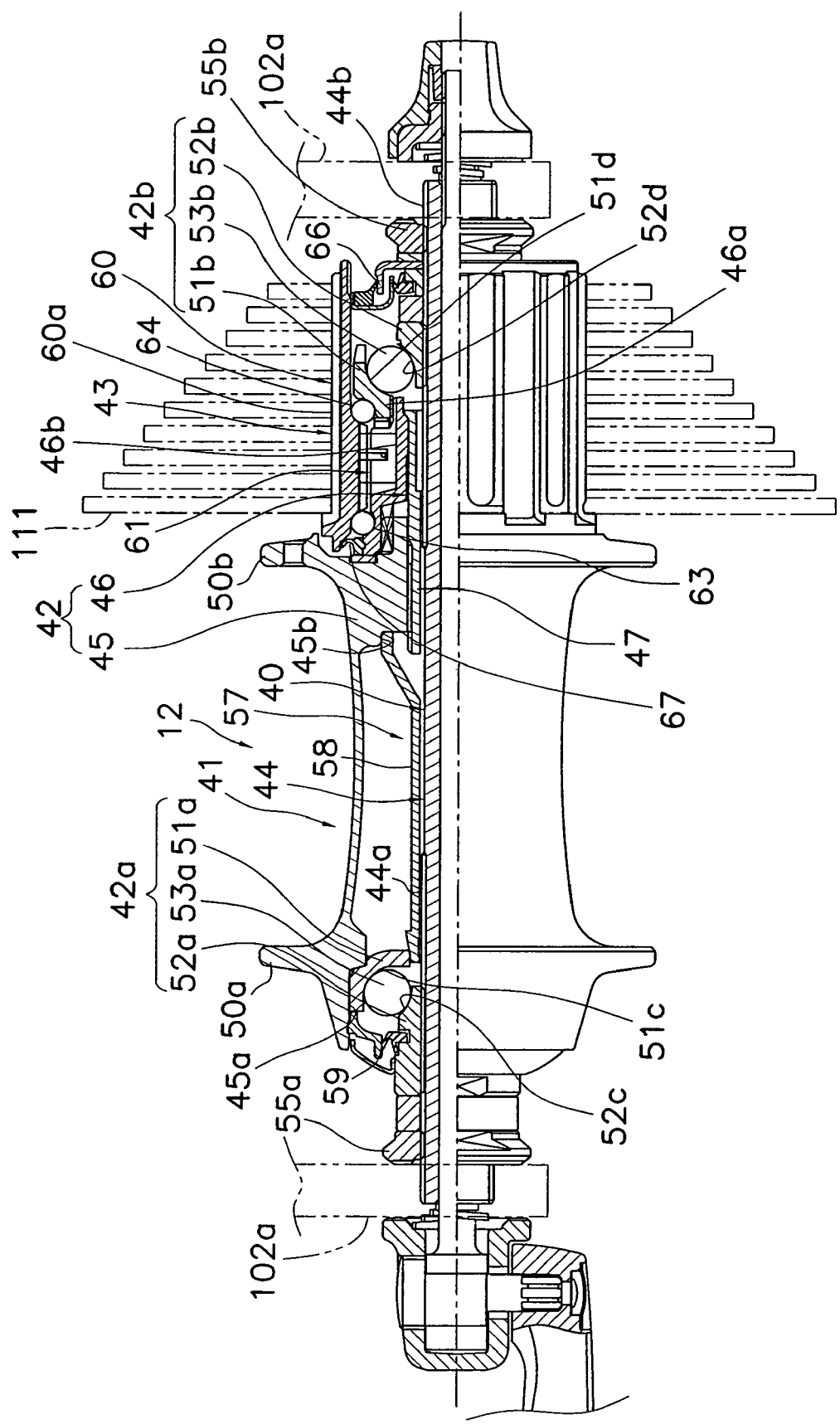
FIG. 3 is a partial cross sectional view of the rear hub in accordance with the first embodiment of the present invention.

As shown in FIG. 3, the rear hub 12 basically comprises a hub axle 40, a hub body 41, a pair of left and right bearings 42a and 42b and a freewheel 43. The hub axle 40 is freely attachable to or detachable from a pair of right and left fork end portions 102a disposed on the rear of the frame 102. The hub body 41 is coaxially disposed radially outwardly with respect to the hub axle 40. The left bearing 42a and the right bearing 42b are disposed between the hub axle 40 and the hub body 41 in one axial end portion of the hub body 41. The freewheel 43 is coupled to the axial end portion of the hub body 41 where the right bearing 42b is coupled to. The freewheel 43 is configured to be coupled to the drive unit 105 on the outer perimeter thereof. The freewheel 43 is also configured to be non-rotatably coupled to a multiple-layer sprockets 111 (e.g., 10 sprockets as shown in a dotted line in FIG. 3).

The hub axle 40 of the rear hub 12 is, for example, a quick release type hub axle, which basically comprises a hollow axle body 44 with a pair of right-handed male screw sections 44a and 44b on the outer peripheral surface thereof. The male screw section 44a is arranged to extend from a portion located slightly inside of the portion to which the left bearing 42a is mounted toward the outward axial direction. The male screw section 44b is arranged to extend from a portion located slightly inside of the portion to which the freewheel 43 is mounted toward the outward axial direction. The structure of the hub axle 40 is basically identical to that of the hub axle 20 of the front hub 10 except for the male screw sections 44a and 44b and the length of the hub axle. Therefore, the structure of the hub axle 40 will not be discussed in detail herein for the sake of brevity.

The hub body 41 of the rear hub 12 preferably includes a hub main body portion 45 and a power transmission member 46. The hub main body portion 45 has a generally tubular shape and is made of aluminum alloy. The hub main body portion 45 is provided with a pair of hub flanges 50a and 50b on the outer peripheral surface thereof, and the spokes 99 are latched on the radial end portions of the hub flanges 50a and 50b. The power transmission member 46 is non-rotatably coupled to the hub main body portion 45. The hub main body portion 45 further includes a bearing mounting section 45a in the one axial end thereof (left end of FIG. 3) where the left bearing 42a is coupled to. Moreover, the hub main body portion 45 has a step section 45b in the inner peripheral surface thereof at a portion adjacent to the right axial end of the hub main body portion 45. The step section 45b is configured and arranged to be coupled to a clearance adjusting member 57.

Figure 4:
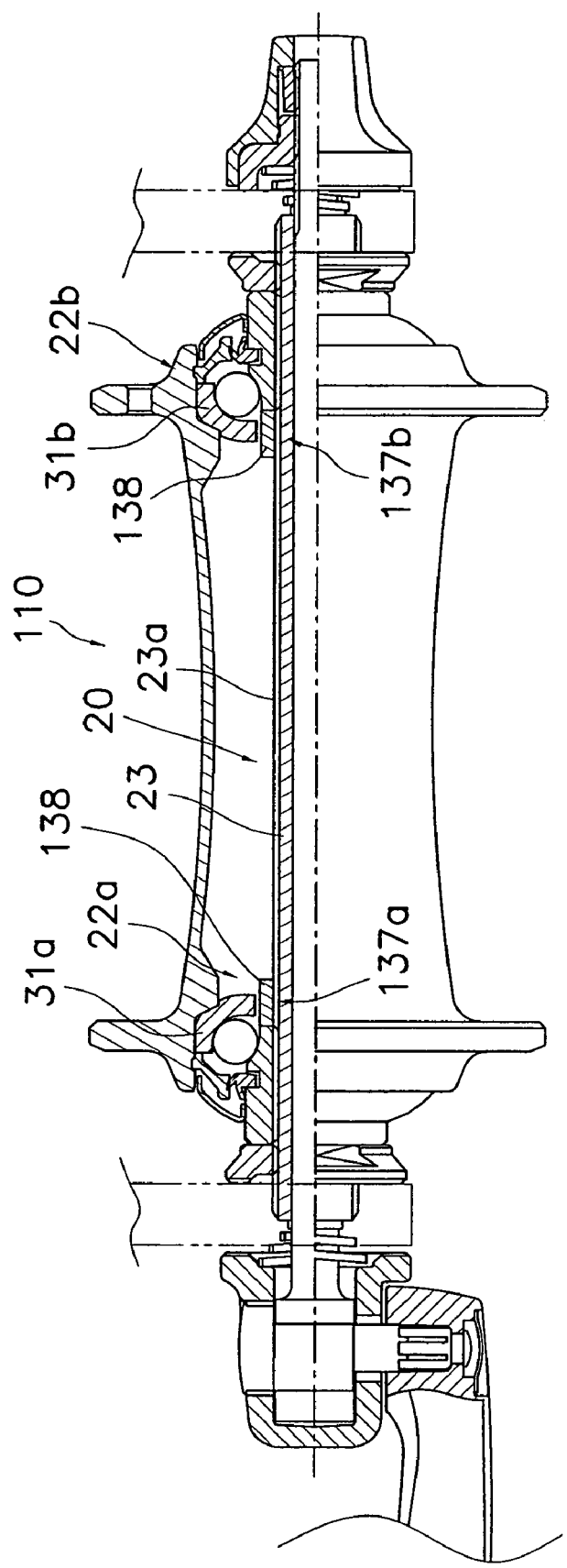
FIG. 4 is a partial cross sectional view of a bicycle hub in accordance with a second embodiment of the present invention.

The power transmission member 46 is preferably a generally cylindrical steel component with a step structure. The inner peripheral surface of the power transmission member 46 in one axial end (left end of FIG. 3) is non-rotatably coupled to the right axial end of the hub main body portion 45 (right end of FIG. 3) by a serrated connection or the like. The power transmission member 46 is fixedly coupled to the hub main body portion 45 by a cylindrical bolt 47, which passes through the inner perimeter of the right axial end portion of the hub main body portion 45 while screwed into the inner perimeter of the hub main body portion 45. The power transmission member 46 has a bearing mounting section 46a on the outer peripheral surface of the right axial end of the power transmission member 46. The right bearing 42b is screwed into the bearing mounting section 46 formed on the power transmission member 46. The power transmission member 46 further includes a clutch mounting recess 46b on the outer peripheral surface thereof, which is disposed axially inwardly with respect to the bearing mounting section 46a. The clutch mounting recess 46b is configured and arranged to be coupled to a one-way clutch 61 as seen in FIG. 4. Furthermore, the power transmission member 46 forms an inner ring portion disposed axially inwardly with respect to the clutch mounting recess 46b on the outer peripheral surface of the power transmission member 46. The inner ring portion of the power transmission member 46 is configured to serve as an inner ring for a first freewheel bearing 63 that is used for supporting the freewheel 43 so that the freewheel 43 freely rotates around the power transmission member 46.

In the structure of the rear hub 12 described above, the cylindrical bolt 47 and the axle body 44 are arranged such that a clearance or gap between the inner peripheral surface of the cylindrical bolt 47 and the outer peripheral surface of the axle body 44 is set to a substantially small value, for example, approximately 0.4 mm. Therefore, the grease leakage from the right bearing 42b toward the axial inner direction is not very problematic.

The left bearing 42a of the rear hub 12 basically comprises a left outer ring or cup 51a, a left inner ring or cone 52a and a plurality of generally spherical shaped rolling components 53a (only one rolling component 53a is shown in FIG. 3). The right bearing 42b basically comprises a right outer ring 51b, a right inner ring 52b and a plurality of generally spherical shaped rolling components 53b (only one rolling component 53b is shown in FIG. 3). The left outer ring 51a is pressed into the bearing mounting section 45a formed on the hub main body portion 45 as seen in FIG. 3. The right bearing 42a is pressed into and attached to the bearing mounting section 46a formed on the power transmission member 46. The right outer ring 51b of the right bearing 42b also includes an inner ring portion that is configured to serve as an inner ring for a second freewheel bearing 64. The second freewheel bearing is configured and arranged to support the freewheel 43 so that the freewheel 43 freely rotates.

The left outer ring 51a includes a ball receiving surface 51c that faces in a generally axially outward direction of the hub axle 44. The left inner ring 52a includes a ball pushing surface 52c that faces in a generally axially inward direction of the hub axle 44. The right outer ring 51b includes a ball receiving surface 51d that faces in a generally axially outward direction of the hub axle 44. The right inner ring 52b includes a ball pushing surface 52d that faces in a generally axially inward direction of the hub axle 44. Thus, similarly to the left and right bearings 22a and 22b of the front hub 10, the left and right bearings 42a and 42b are arranged as the angular ball bearings, in which the load capacity relative to the thrust direction becomes greater. The left inner ring 52a and the right inner ring 52b are screwed into the male screw sections 44a and 44b, respectively, which are formed on the axle body 44 of the hub axle 40 as seen in FIG. 3.

The axial positions of the first Inner ring 52a and the right inner ring 52b are locked by the lock nuts 55a and 55b, which are installed in contact with the axial outer surface of the left inner ring 52a and the right inner ring 52b, respectively. Therefore, the left inner ring 52a and the right inner ring 52b are not movable in the axial direction with respect to the hub body 41. A sealing component 59 is coupled to the axial outer end portion the left bearing 42a. Therefore, the grease contained in the left bearing 42a is less likely to leak from the left bearing 42a toward the axial outward direction.

The clearance adjusting member 57 is disposed on the radial innermost surface of the left outer ring 51a, which is closest to the outer peripheral surface of the hub axle 40. In this first embodiment, the clearance adjusting member 57 used in the rear hub 12 is arranged as a tubular member 58 with a first axial end (left side end in FIG. 3) of the tubular member 58 is coupled to the radial innermost surface of the left outer ring 51a, and a second axial end (right side end in FIG. 3) of the tubular member 58 is coupled to the step section 45b of the hub main body portion 45. More specifically, the first axial end of the tubular member 58 is coupled to the radial innermost surface of the left outer ring 51a such that a certain degree of clearance is maintained between the tubular member 58 and the hub axle 40. The tubular member 58 is preferably arranged such that the diameter of the second axial end of the tubular member 58 is larger than the diameter of the first axial end of the tubular member 58, and the diameter of the tubular member 58 gradually becomes larger from the first axial end toward the second axial end in a tapered manner. The clearance between the radial innermost peripheral surface at the first axial end of the tubular member 58 and the male screw section 44a formed on the axle body 44 of the hub axle 40 is preferably set to a substantially small value, e.g., approximately 0.4 mm.

As seen in FIG. 3, the freewheel 43 is provided with a sprocket mounting section 60a, a drive unit 60, and the one-way clutch 61. The sprocket mounting section 60a is formed in the outer peripheral surface of the freewheel 43 for mounting the multiple-layer sprocket 111. The drive unit 60 is supported by the outer perimeter of the power transmission member 46 so that the drive unit 60 freely rotates around the power transmission member 46. More specifically, the drive unit 60 is supported by the first freewheel bearing 62 and the second freewheel bearing 63 such that the drive unit 60 freely rotates around the power transmission member 46. The one-way clutch 61 is disposed between the drive unit 60 and the power transmission member 46 to transmit only the rotation of the direction of travel of the drive unit 60 to the power transmission member 46. The one-way clutch 61 is a fork end type clutch coupled to the clutch mounting recess 46b of the power transmission member 46 so that it freely swings and transmits the rotation of the drive unit 60 to the power transmission member 46.

The clearance between the drive unit 60 and the hub axle 40, and the clearance between the drive unit 60 and the power transmission member 46, are sealed by a pair of sealing components 66 and 67. Therefore, the grease inside the bearings is unlikely to leak to the outside of the freewheel 43.

Accordingly, similarly to the front hub 10, with the rear hub 12 of the first embodiment as described above, the clearance between the left outer ring 51a and the axle body 44 of the hub axle 40 in the radial direction is narrowed by providing the clearance adjusting member 57 on the radial innermost peripheral surface of the left outer ring 51a. Therefore, the grease contained inside the left bearing 42a is less likely to leak toward the axial inner direction of the hub axle 40. In particular, when the clearance adjusting member 57 is not provided with the left bearing 42a shown on the left side of FIG. 3, the grease inside the left bearing 42a tends to leak in the direction toward the axial outer portion (toward left side of FIG. 3) when the rear wheel 107 rotates in the direction of travel as the right-handed male screw section 44a acting as the pump. Thus, in the first embodiment of the present invention, the grease is further prevented from leaking toward the inner axial direction (toward right of FIG. 3). Since the clearance adjusting member 57 is disposed between the left outer ring 51a and the hub axle 40, the grease leakage from the left bearing 42a that is disposed on an axial side of the hub axle 40 that is opposite from where the freewheel 43 is mounted can be prevented. Moreover, since the male screw section 44a is a right-handed screw, the pump effect of the male screw section 44a of the hub axle 40 is utilized to further prevent leakage from the left bearing 42a.

In the first embodiment of the present invention, the clearance adjusting member 57 is arranged such that a right axial end portion thereof has a larger diameter than a left axial end portion thereof, and the diameter of the clearance adjusting member is gradually increased from the left axial end portion to the right axial end portion in a tapered manner as seen in FIG. 3. Therefore the clearance adjusting member 57 can be supported by the radial inner surface of the hub body 41 at the step section 45b.

With the first embodiment of the present invention, since the clearance can be adjusted by mounting the O-rings 38 utilizing the convex/concave nature of the male screw section 23a, the structure of the clearance adjusting member 37 is simplified. In addition, by arranging a plurality of O-rings 38 side by side in a line, the effects of preventing the leakage of the grease can be further increased.

SECOND EMBODIMENT

Referring now to FIG. 4, a front hub 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The front hub 110 of the second embodiment is basically identical to the front hub 10 of the first embodiment illustrated in FIG. 2 except that O-rings 38 used as the clearance adjusting members 37a and 37b are substituted with the cylindrical members 138 used as clearance adjusting members 137a and 137b as shown in FIG. 4. More specifically, in the second embodiment, the cylindrical members 138 are used as the clearance adjusting members for the left and right bearings 22a and 22b. The cylindrical members 138 are preferably made of a material with heat contraction properties such as synthesized resin with heat contraction properties. In the second embodiment, the cylindrical members 138 are mounted to the outer peripheral surface of the axle body 23 of the hub axle 20 at positions that face the left outer ring 31a and the right outer ring 31b as seen in FIG. 4. In this embodiment as well, the clearance between the left outer ring 31a and the right outer ring 31b and the male screw section 23a of the axle body 23 is narrowed by providing the clearance adjusting members 137a and 137b on the male screw section 23a. Similarly to the first embodiment, the clearance adjusting members 137a and 137b are configured such that a minimum clearance or gap between the radial outer most surface of the clearance adjusting members 137a and 137b and the radial inner surface of the left outer ring 31a and the right outer ring 31b is set to, for example, approximately 0.4 mm.

In the second embodiment of the present invention, since the clearance adjusting members 137a and 137b are made of a material with heat contraction properties, the clearance adjusting members 137a and 137b can be easily mounted onto the hub axle 20 simply by mounting the clearance adjusting members 137a and 137b onto the hub axle 20 and heating them.

THIRD EMBODIMENT

Figure 5:
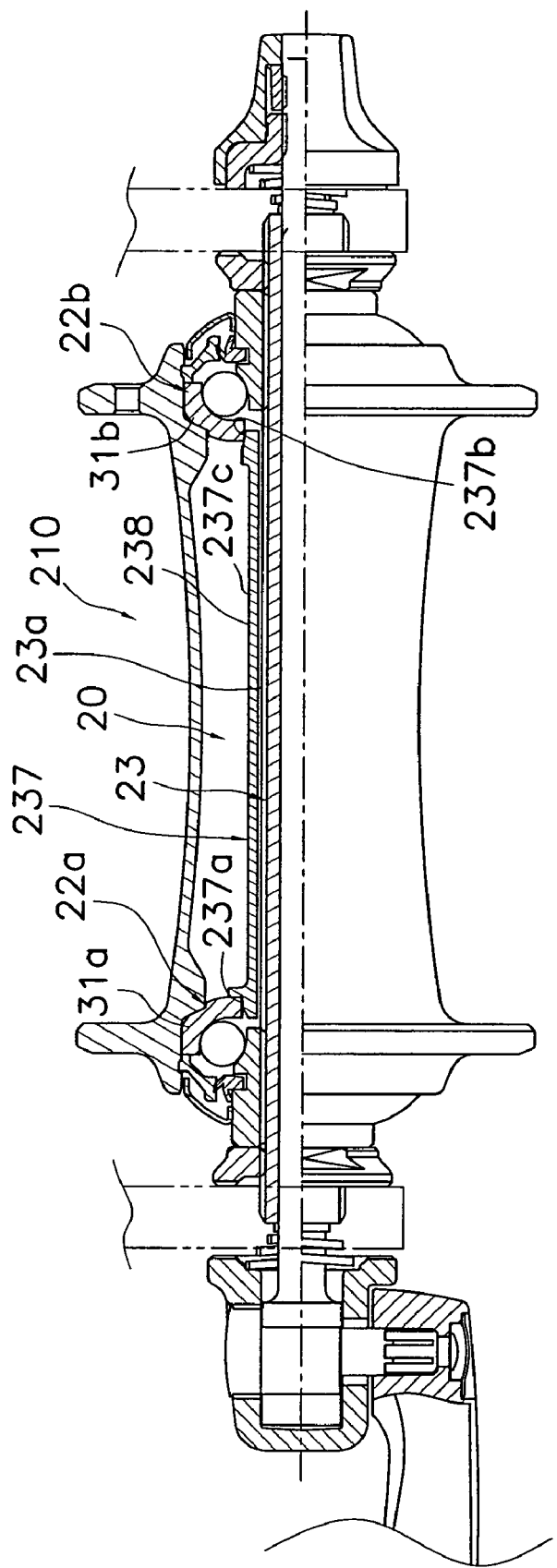
FIG. 5 is a partial cross sectional view of a bicycle hub in accordance with a third embodiment of the present invention.

Referring now to FIG. 5, a front hub 210 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The front hub 210 of the third embodiment shown in FIG. 5 is basically identical to the front hub 20 of the first embodiment except for the clearance adjusting members 37a and 37b of the first embodiment are substituted by a clearance adjusting member 237. The clearance adjusting member 237 is preferably arranged as a cylindrical member 238 that is made of a material such as synthesized resin or metal. The cylindrical member 238 is configured as a one-piece member that extends between the left outer ring 31 a of the left bearing 22a and the right outer ring 31b of the right bearing 22b. More specifically, the cylindrical member 238 includes a left engaging portion 237a, a right engaging portion 237b, and a cylindrical body portion 237c. The left engaging portion 237a is coupled to the radial innermost surface of the left outer ring 31a, and the right engaging portion 237b is coupled to the radial innermost surface of the right outer ring 31b as seen in FIG. 5. The cylindrical body portion 237c extends between the left engaging portion 237a and the right engaging portion 237b. With the front hub 210 of the third embodiment, the radial clearance between the male screw section 23a formed on the axle body 23 and the left outer ring 31a or is narrowed by mounting the clearance adjusting member 237 to the left outer ring 31a and Second Outer ring 31 as seen in FIG. 5. The clearance adjusting member 237 is configured such that a minimum clearance or gap between the radial inner most surface of the clearance adjusting member 237 and the male screw section 23a formed on the axle body 23 of the hub axle 20 is set to, for example, approximately 0.4 mm In the third embodiment of the present invention, since the clearance adjusting member 237 is formed as a one-piece member with the left and right engaging portions 237a and 237b coupled to the radial inner surfaces of the left and right outer rings 31a and 31b, the leakage of grease can be prevented. Moreover, since the hub axle 20 is covered by the clearance adjusting member 237 between the let and right outer rings 31a and 31b, even when the grease leaks from the left and/or right bearings 22a and 22b, the grease is prevented from adhering to the back side of the left and/or right outer rings 31a and 31b. Therefore, the amount of grease leakage is decreased.

FOURTH EMBODIMENT

Figure 6:
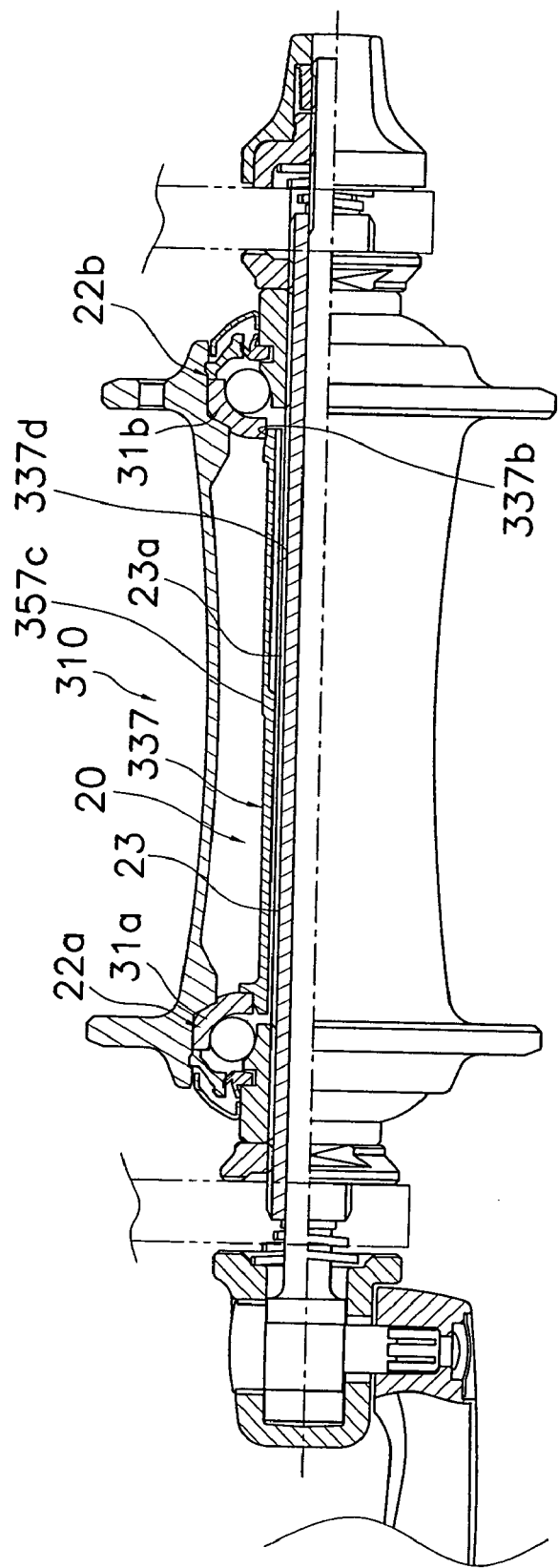
FIG. 6 is a partial cross sectional view of a bicycle hub in accordance with a fourth embodiment of the present invention.

Referring now to FIG. 6, a front hub 310 in accordance with a fourth embodiment will now be explained. In view of the similarity between the third and fourth embodiments, the parts of the fourth embodiment that are identical to the parts of the third embodiment will be given the same reference numerals as the parts of the third embodiment. Moreover, the descriptions of the parts of the fourth embodiment that are identical to the parts of the third embodiment may be omitted for the sake of brevity.

The front hub 310 of the fourth embodiment shown in FIG. 6 is basically identical to the front hub 210 of the third embodiment except that the clearance adjusting member 237 of the third embodiment is substituted by a clearance adjusting member 337 in the fourth embodiment. More specifically, the clearance adjusting member 337 of the fourth embodiment differs from the clearance adjusting member 237 of the third embodiment in that the clearance adjusting member 337 includes a right-handed female screw section 337d on the inner peripheral surface thereof which is adjacent to the right bearing 22b. More specifically, the female screw section 337d is arranged to extend on the inner peripheral surface of the clearance adjusting member 337 from the right side portion of the cylindrical body portion 337b to the right engaging portion 337b. The female screw section 337d is configured and arranged such that the pumping effect of the female screw section 337d counteracts the pumping effect of the male screw section 23a formed on the axle body 23 of the hub axle 20. Alternatively, the female screw section 337d can be configured and arranged such that the pumping effect of the female screw section 337d exceeds the pumping effect of the male screw section 23a to generate a flow toward the axial outward direction against the pumping effect of the male screw section 23a. Therefore, in the fourth embodiment of the present invention, the leakage of the grease from the right bearing 22b toward the axial inner direction is further decreased.

In the fourth embodiment of the present invention, the pump effect of the female screw section 337d counter act or overcome the pump effect of the male screw section 23a on the right side of the hub axle 20 when facing the direction of travel of the bicycle. Thus, the grease leakage can be further prevented.

FIFTH EMBODIMENT

Figure 7:
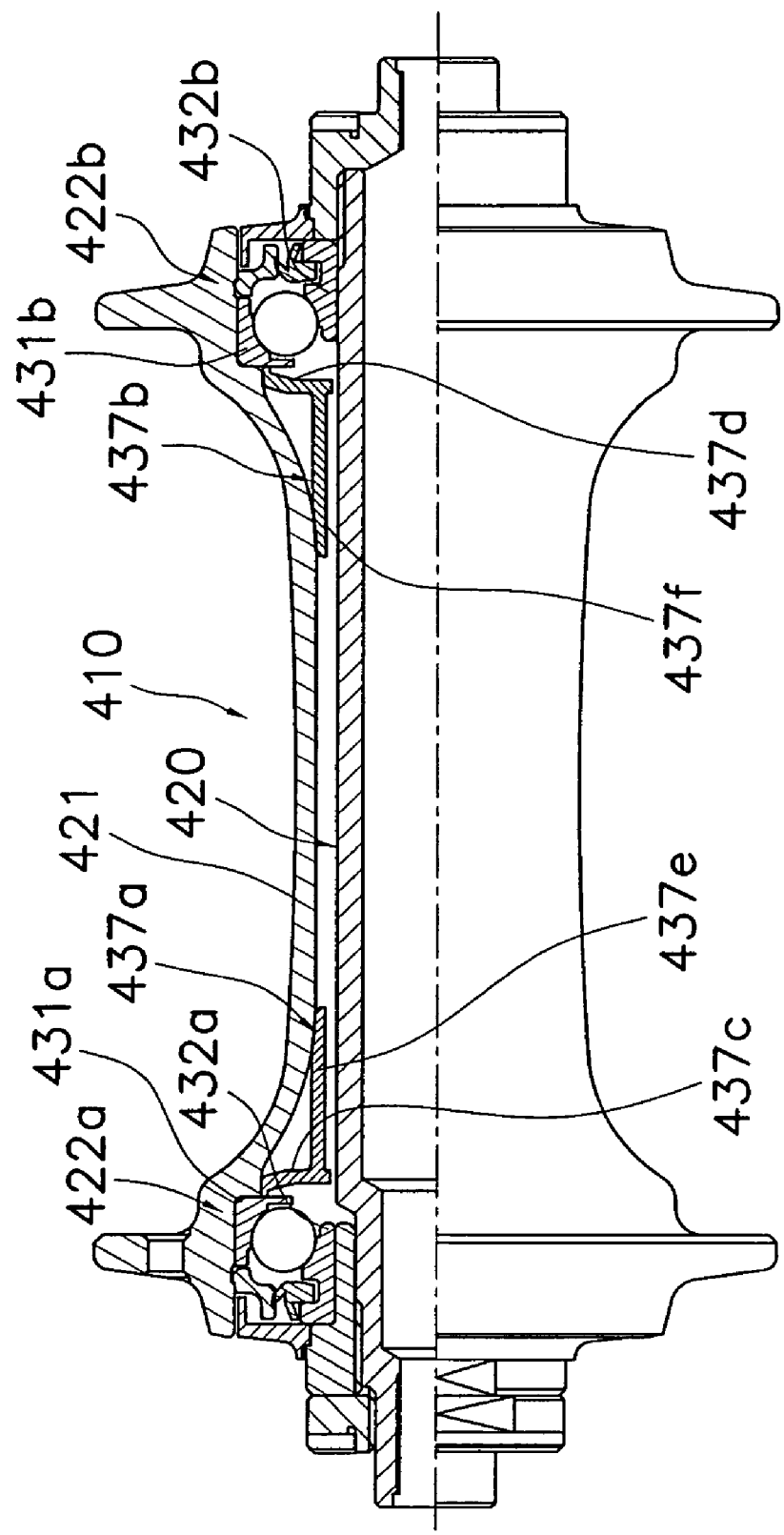
FIG. 7 is a partial cross sectional view of a bicycle hub in accordance with a fifth embodiment of the present invention.
Figure 8:
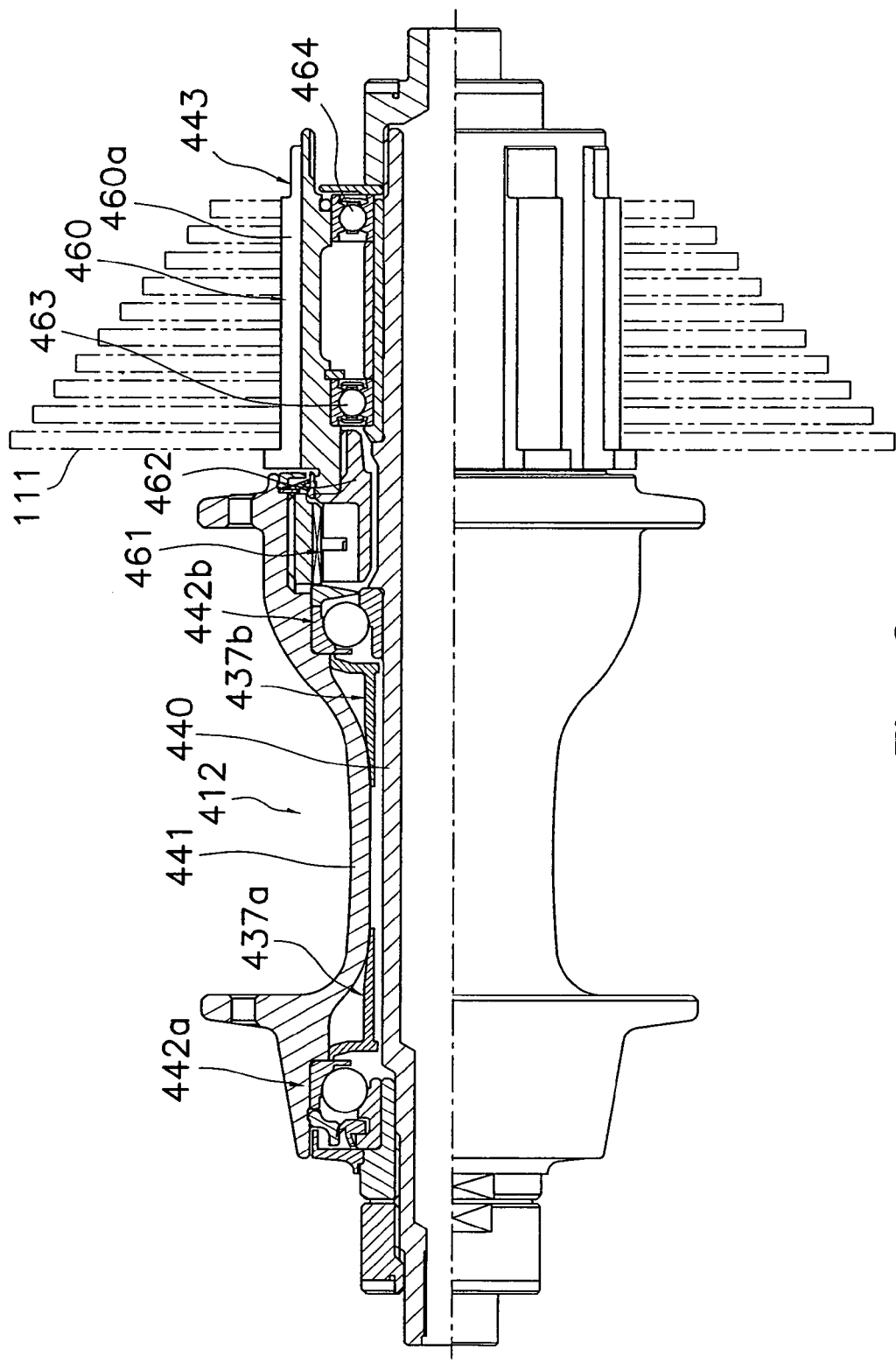
FIG. 8 is a partial cross sectional view of a bicycle hub in accordance with the fifth embodiment of the present invention.

Referring now to FIGS. 7 and 8, a front hub 410 and a rear hub 412 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The front hub 410 of the fourth embodiment differs from the bicycle hub 10 of the first embodiment in that a pair of male screw sections 420a and 420b are formed in only axial end portions of the hub axle 420 where left and right inner rings 432a and 432b of the left and right bearings 422a and 422b are coupled to as seen in FIG. 7, instead of having the male screw section 23a extending across the entire outer peripheral surface of the hub axle 20 as seen in FIG. 2. Thus, in this embodiment of the present invention, the front hub 410 is provided with a left clearance adjusting member 437a and a right clearance adjusting member 437b that are mounted to the inner perimeter of a hub body 421 such that the left and right clearance adjusting members 437a and 437b abut against the axial inner surface of left and right outer rings 431a and 431b of the left and right bearings 422a and 422b, respectively.

Each of the left clearance adjusting member 437a and the right clearance adjusting member 437b are arranged as a cylindrical member with a flange. More specifically, the left and right clearance adjusting members 437a and 437b include first and second flange portions 437c and 437d, and first and second cylindrical body portions 437e and 437f, respectively. The first and second flange portions 437c and 437d of the left and right clearance adjusting member 437a and 437b are configured to have a larger maximum diameter than the first and second cylindrical portions 437e and 437f, respectively. The first and second flange portions 437c and 437d are mounted to the inner perimeter of the hub body 421, and abut against the axial inner surfaces of the left outer ring 431a and the right outer ring 431b, respectively. The first and second cylindrical body portions 437e and 437f of the left and right clearance adjusting members 437a and 437b extend from the radial inner portion of the first flange portion 437c and the second flange portion 437d, respectively, toward the inner axial inner direction. The first and second cylindrical body portions 437e and 437f are supported by the inner perimeter of the hub body 21, which has been reduced in diameter. As seen in FIG. 7, the radial innermost portion of the first flange portion 437c and the second flange portion 437d protrude radially inwardly comparing to the first and second cylindrical body portions 437e and 437f. The clearance adjusting members 437a and 437b are configured such that a clearance or gap between the radial inner most surface of the first flange portion 437c and the second flange portion 437d of the clearance adjusting members 437a and 437b and the radial outer peripheral surface of the hub axle 420 is set to, for example, approximately 0.4 mm.

Moreover, the left clearance adjusting member 437a and the right clearance adjusting member 437b described above can be applied to the rear hub 412 as shown in FIG. 8 in accordance with the fifth embodiment of the present invention.

The rear hub 412 of the fifth embodiment comprises a hub axle 440, a hub body 441, a left bearing 442a, a right bearing 442b and a freewheel 443. The freewheel 443 is equipped with a drive unit 460 with a sprocket mounting section 460a. The drive unit 460 is supported by the hub axle 40 so that the sprocket mounting section 460a freely rotates around the hub axle 440. The sprocket mounting section 460a is configured to be coupled to the multiple-layer sprocket 111 on the outer perimeter thereof as seen in FIG. 8. The freewheel 443 further includes a tubular part 462 that is non-rotatably mounted to the drive unit 460, and the one-way clutch 61 that is installed between the tubular part 462 and the hub body 421. The one-way clutch 61 is configured and arranged to transmit only the rotation of the direction of travel of the drive unit 460 to the hub body 421. A first freewheel bearing 463 and a second freewheel bearing 464 are mounted between the drive unit 460 and the hu axle 440. The first and second freewheel bearings 463 and 464 are arranged as a conventional sealed ball bearings that are well known in the art.

As seen in FIG. 8, the rear hub 412 of the fifth embodiment has a positional relationship of the hub body 441 and the left and right bearings 442a and 442b First that is similar to that of the front hub 410 shown in FIG. 7. Therefore, the clearance adjusting members 437a and 437b as explained above with reference to FIG. 7 can be utilized to prevent the grease from flowing out from the left and right bearings 442a and 442b in the rear hub 412 as shown in FIG. 8. Since the clearance adjusting members 437a and 437b are provided to both the left and right bearings 442a and 442b, the leakage of grease contained in the left and right bearings 442a and 442b can be prevented in the rear hub 412.

In the fifth embodiment as explained above, each of the clearance adjusting members has a generally cylindrical shape with a flange. Since the flange of the clearance adjusting member is mounted to the hub body and contacting the axial inner surface of the outer ring of the bearing, the clearance adjusting member can be mounted regardless of the size or shape of the outer ring of the bearing.

Accordingly, with the bicycle hub, as the hub body rotates along with the wheels in the direction of travel, grease contained in the bearing becomes fluid, and flows out from the bearings through the clearances between the outer rings and the hub axle. In particular, when a male screw is formed on the hub axle, the grease is more likely to flow out because of the pumping effect of the male screw. Thus, in the bicycle hub in accordance with the first to fifth embodiments of the present invention, the clearance adjusting member is disposed between the bearing and the hub axle to narrow the clearance between the outer ring of the bearing and the hub axle. The clearance adjusting members is disposed with respect to the outer ring of the bearing such that at least a portion of the clearance adjusting member is disposed axially inwardly of the outer ring.

Therefore, even when a male screw is formed on the hub axle, the leakage of grease from the bearing toward the axial inner direction of the hub axle can be prevented without deteriorating the smooth rotation of the bicycle hub.

The bearings in the present invention are arranged as an angular-type bearing with an outer ring and an inner ring. The outer ring of the bearing includes a ball receiving surface that faces in a generally axially outward direction, and the inner ring of the bearing includes a ball pushing surface that faces in a generally axially inward direction. Accordingly, with such angular-type bearings, the load capacity relative to the thrust force becomes larger, and the working face of the ball pushing surface (e.g., abutment state of the bearing surface and the bearing balls) can be adjusted by adjusting an axial position of the inner rings toward the axial inner direction.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

According to the present invention, a clearance adjusting member is installed so as to narrow the clearance present between the outer rings and the hub axle in the inner axial direction of both outer rings, or at a minimum, of either one of the outer rings, thus narrowing the clearance between the outer rings and the hub axle. Therefore, even when a male screw is formed on the hub axle, the leakage of grease from the bearing towards the inner axial direction may be prevented.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:
   a hub axle;
   a hub body coaxially coupled on the hub axle so that the hub body is disposed radially outwardly with respect to the hub axle;
   a first bearing disposed between the hub body and the hub axle so that the hub body freely rotates with respect to the hub axle, the first bearing including
      a first outer ring coupled to the hub body,
      a first inner ring non-rotatably coupled to the hub axle in a position with respect to the first outer ring so that the first inner ring faces the first outer ring, and
      a plurality of first rolling components installed between the first outer ring and the first inner ring; and
   a clearance adjusting member disposed with respect to the first outer ring of the first bearing such that at least a portion of the clearance adjusting member is disposed radially inwardly of the first outer ring, the clearance adjusting member being configured and arranged to prevent a grease inside the first bearing from leaking toward an axially inward direction of the hub axle with a prescribed radial clearance being maintained between the clearance adjusting member and the first outer ring of the first bearing,
   the clearance adjusting member including at least one O-ring mounted on the hub axle, the O-ring being arranged to at least partially axially overlap the first outer ring of the first bearing such that the prescribed radial clearance is formed between a radial outer surface of the O-ring and a radial inner surface of the first outer ring of the first bearing.

2. The bicycle hub as recited in claim 1, wherein the first outer ring of the first bearing includes a ball receiving surface that faces in a generally axially outward direction and the first inner ring of the first bearing includes a ball pushing surface that faces in a generally axially inward direction.

3. The bicycle hub as recited in claim 1, further comprising
   a second bearing disposed between the hub body and the hub axle at an axial end portion of the bicycle hub that is axially spaced from the first bearing so that the hub body freely rotates with respect to the hub axle, the second bearing including
      a second outer ring coupled to the hub body,
      a second inner ring non-rotatably coupled to the hub axle in a position with respect to the second outer ring so that the second inner ring faces the second outer ring, and
      a plurality of second rolling components installed between the second outer ring and the second inner ring.

4. The bicycle hub as recited in claim 1, wherein the prescribed radial clearance is about 0.4 millimeters.

5. A bicycle hub comprising:
   a hub axle;
   a hub body coaxially coupled on the hub axle so that the hub body is disposed radially outwardly with respect to the hub axle;
   a first bearing disposed between the hub body and the hub axle so that the hub body freely rotates with respect to the hub axle, the first bearing including
      a first outer ring coupled to the hub body,
      a first inner ring non-rotatably coupled to the hub axle in a position with respect to the first outer ring so that the first inner ring faces the first outer ring, and
      a plurality of first rolling components installed between the first outer ring and the first inner ring; and
   a clearance adjusting member disposed with respect to the first outer ring of the first bearing such that at least a portion of the clearance adjusting member is disposed radially inwardly of the first outer ring, the clearance adjusting member being configured and arranged to prevent a grease inside the first bearing from leaking toward an axially inward direction of the hub axle with a prescribed clearance being maintained between the clearance adjusting member and the first outer ring of the first bearing.
   the hub axle including a male screw section with the clearance adjusting member including at least one O-ring mounted on the male screw section of the hub axle.

6. The bicycle hub as recited in claim 5, wherein the prescribed clearance is measured in radial direction between a radial outer surface of the O-ring and a radial inner surface of the first outer ring of the first bearing.

7. The bicycle hub as recited in claim 6, wherein the prescribed clearance is about 0.4 millimeters.

8. The bicycle hub as recited in claim 5, wherein the prescribed clearance is about 0.4 millimeters.

9. A bicycle hub comprising:
   hub axle;
   a hub body coaxially coupled on the hub axle so that the hub body is disposed radially outwardly with respect to the hub axle;
   a first bearing disposed between the hub body and the hub axle so that the hub body freely rotates with respect to the hub axle, the first bearing including
      a first outer ring coupled to the hub body,
      a first inner ring non-rotatably coupled to the hub axle in a position with respect to the first outer ring so that the first inner ring faces the first outer ring, and
      a plurality of first rolling components installed between the first outer ring and the first inner ring; and
   a clearance adjusting member disposed with respect to the first outer ring of the first bearing such that at least a portion of the clearance adjusting member is disposed radially inwardly of the first outer ring, the clearance adjusting member being configured and arranged to prevent a grease inside the first bearing from leaking toward an axially inward direction of the hub axle with a prescribed radial clearance being maintained between the clearance adjusting member and one of the hub axle and the first outer ring of the first bearing, the clearance adjusting member including an outer sloped surface that is inclined relative to a longitudinal center axis of the hub axle and at least partially axially overlaps the first outer ring of the first bearing, the hub body further including a sprocket mounting section disposed in an axial end portion of the hub body that is axially spaced from the first bearing, the sprocket mounting section being configured and arranged to be coupled to at least one sprocket, and a freewheel coupled to the sprocket mounting portion.

10. The bicycle hub as recited in claim 9, further comprising a second bearing disposed between the hub body and the hub axle at an axial end portion of the bicycle hub that is axially spaced from the first bearing so that the hub body freely rotates with respect to the hub axle, the second bearing including a second outer ring coupled to the hub body, a second inner ring non-rotatably coupled to the hub axle in a position with respect to the second outer ring so that the second inner ring faces the second outer ring, and a plurality of second rolling components installed between the second outer ring and the second inner ring.

11. The bicycle hub as recited in claim 10, wherein the hub body includes a hub main body portion with the first bearing disposed in an axial end portion thereof, and a generally cylindrical shaped power transmission member coupled in an axial end portion of the hub main body portion that is axially spaced apart from the first bearing with the second bearing disposed in an axial end portion of the power transmission member that is axially spaced from a coupling section between the power transmission member and the hub main body portion.

12. The bicycle hub as recited in claim 11, wherein the freewheel includes a drive unit rotatably coupled to an outer peripheral surface of the power transmission member of the hub body with the sprocket mounting section being formed on an outer peripheral surface thereof, and a one-way clutch configured to transmit the rotation of the drive unit only in a direction of travel to the power transmission member of the hub body.

13. The bicycle hub as recited in claim 12, wherein the clearance adjusting member has a generally cylindrical shape with a first axial end coupled to the radial inner surface of the first outer ring such that the prescribed radial clearance is formed between the radial inner surface of the first axial end of the cylindrical member and the outer peripheral surface of the hub axle, and a second axial end coupled to an inner peripheral surface of the hub body.

14. The bicycle hub as recited in claim 12, wherein the clearance adjusting member is arranged such that the second axial end has a larger diameter than the first axial end and the diameter of the clearance adjusting member gradually becomes larger from the first axial end to the second axial end in a tapered manner.

15. The bicycle hub as recited in claim 9, wherein the sloped outer surface of the clearance adjusting member tapers away from the longitudinal center axis of the hub axle as the sloped outer surface approaches the sprocket mounting section.

16. The bicycle hub as recited in claim 15, wherein the sloped outer surface of the clearance adjusting member contacts a radially innermost surface of the first outer ring of the first bearing such that the prescribed radial clearance is measured between an inner radial surface of the clearance adjusting member and an outer surface of the hub axle.

17. The bicycle hub as recited in claim 16, wherein the prescribed radial clearance is about 0.4 millimeters.

18. The bicycle hub as recited in claim 15, wherein the clearance adjusting member has a substantially step-shaped configuration with a tubular section spaced toward the sprocket mounting section from the first bearing having a larger diameter than a tubular section of the clearance adjustment member at least partially overlapping the first outer ring of the first bearing.

19. The bicycle hub as recited in claim 9, wherein the sloped outer surface of the clearance adjusting member contacts a radially innermost surface of the first outer ring of the first bearing such that the prescribed radial clearance is measured between an inner radial surface of the clearance adjusting member and an outer surface of the hub axle.

20. The bicycle hub as recited in claim 19, wherein the hub axle includes a male screw section at least partially axially overlapping the clearance adjusting member and the first outer ring of the first bearing.

21. The bicycle hub as recited in claim 9, wherein the prescribed radial clearance is about 0.4 millimeters.

22. The bicycle hub as recited in claim 9, wherein the clearance adjusting member has a substantially step-shaped configuration with a tubular section spaced toward the sprocket mounting section from the first bearing having a larger diameter than a tubular section of the clearance adjustment member at least partially overlapping the first outer ring of the first bearing.

* * * * *